Sheet 1
2 Sheets
Mc C. Young, Jr.
Harvester Rake.
No 779 Reissued Jul. 19, 1859.
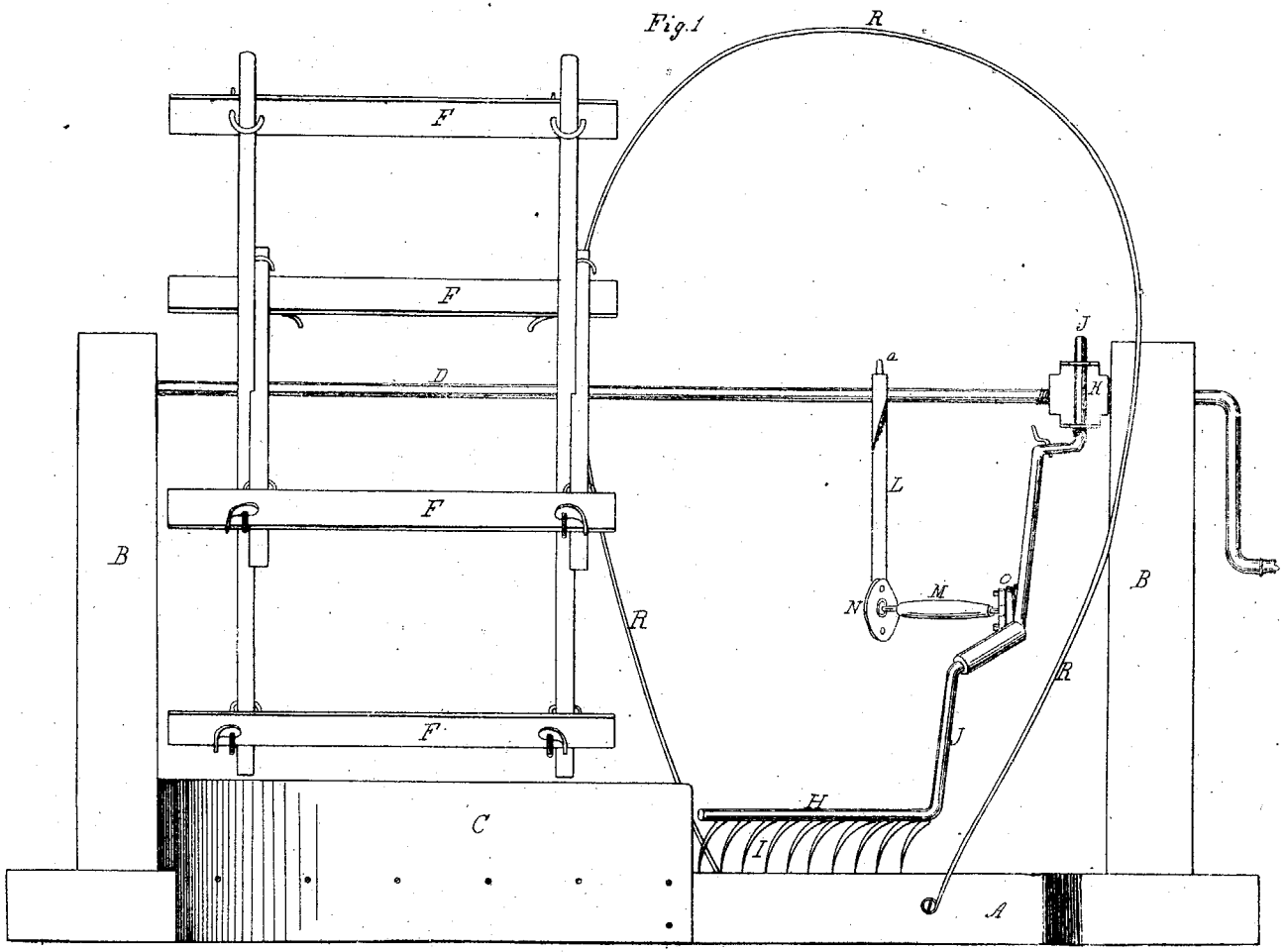
Witnesses
Z. C. Robbins
Wm Yorke A. Lee
Inventor
McClintock Young Jr Sheet 2
2 Sheets
McC Young, Jr.
Harvester Rake.
No 779 Reissued Jul. 19, 1859.
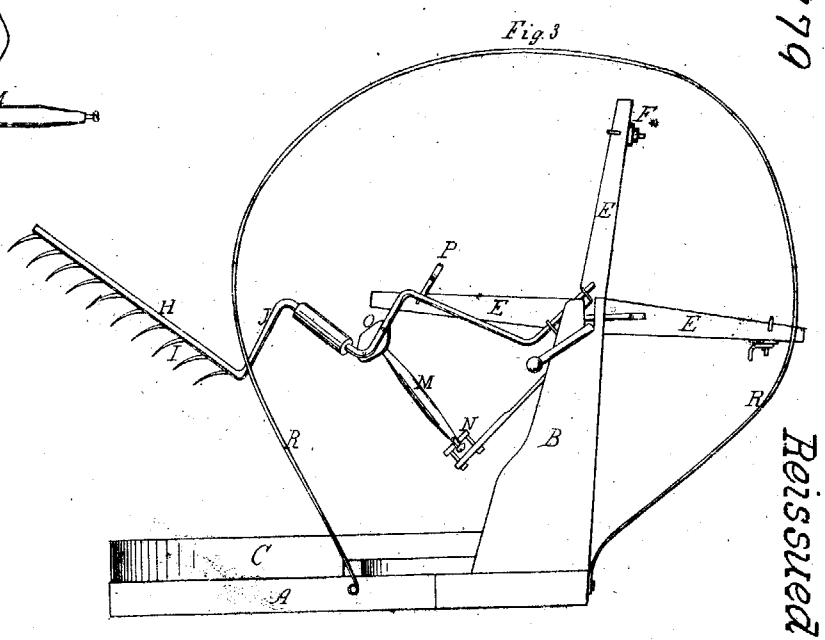
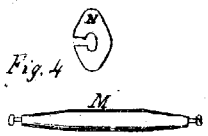
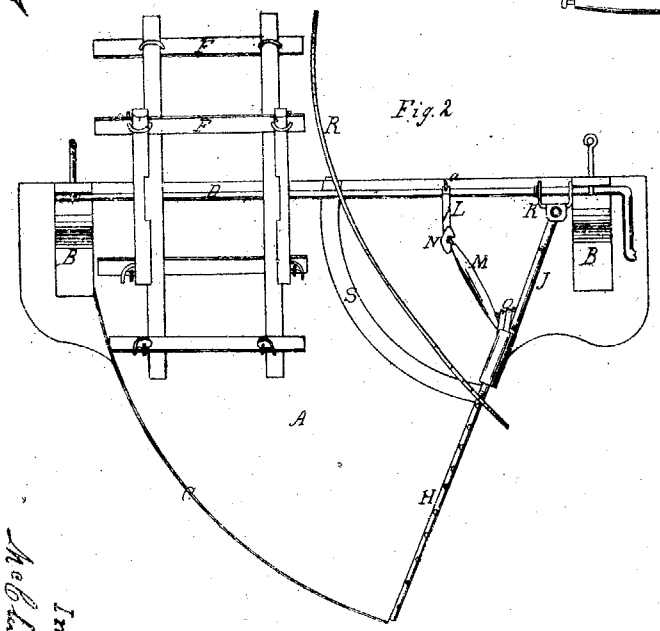
Witnesses
Z. C. Robbins
Wm. Yorke Arden
Inventor
McClintock Young, Jr.

UNITED STATES PATENT OFFICE.

McCLINTOCK YOUNG, JR., OF FREDERICK, MARYLAND.

IMPROVEMENT IN HARVESTERS.

Specification forming part of Letters Patent No. 21,587, dated September 21, 1858; Reissue No. 779, dated July 19, 1859.

*To all whom it may concern:*

Be it known that I, McCLINTOCK YOUNG, Jr., of the city and county of Frederick, and State of Maryland, have invented a new and improved raking apparatus for that description of harvesting-machines which are supplied with sector-shaped platforms; and I do hereby declare that the following is a full and exact description thereof, reference being had to the accompanying drawings, making a part of this specification.

Figure 1 is a rear elevation of the sector-shaped platform of a harvesting-machine; Fig. 2, a top view of the same; Fig. 3, an end view; and Fig. 4, a separate view of the pitman M, which forms a portion of my improved raking apparatus.

Similar letters indicate like parts in each of the drawings.

My improvement in the raking apparatus of the above mentioned description of harvesting-machines consists in so combining the extremity of the handle of the rake with a transverse shaft that the rotation of the said shaft, when aided by a curved guiding-rod, will impart the following movements to said rake, viz: a sweeping axial movement from the inner edge of the platform (or a little beyond the same) over to the forward portion of said platform, and at that point changing to an axial horizontal movement across the same to the starting-point, and so onward in regular succession, which movements enable the said rake to throw the cut stalks of grain in compact gavels from the inner edge of the platform into the path that has just been passed over by the team, and entirely beyond the reach of the team and of the machine during the succeeding movement of the same across the grain-field.

In the accompanying drawings, A marks the platform of the machine; B B, the stanchions which support the reel-shaft D; C, the rim or guard around the curved portion of the platform; E E, the arms of the reel; F F, the gatherers of the reel; H, the rake-head; I I, the rake-teeth; J, the handle of the rake; K, a universal joint connecting the extremity of the rake-handle with the shaft D; L, an arm on the shaft D, which is secured in any desired position by means of the set-screw *a*. M is a pitman uniting the extremity of the arm L to the rake-handle J by means of the ball-and-socket joints N and O. R is a curved guiding-rod, which assists the shaft D and the parts which combine the same with the rake-handle in imparting the requisite movements to the rake.

The shape of the platform is clearly shown by Fig. 2.

The operation of the machine is as follows: As the machine is drawn along its path of progress the reel-shaft D is caused to revolve by any suitable gearing. The operation may be supposed to commence when the rake is at the inner edge of the platform, as shown in Fig. 2. The arm L and the pitman M cause the revolution of the shaft D to raise the rake along its guide R, and when it has attained its highest point it is conducted downward to the proper position for the arm L and pitman M to carry the said rake across the platform to the starting-point, and thus the operation is continued.

The drawings represent the handle J of the rake H as being connected to the reel-shaft D of a harvesting-machine; but it is obvious that the arrangement and construction of the parts may be varied by ordinary mechanical skill without departing from the principle of my invention. Therefore I do not intend to restrict myself to the precise arrangement of the parts which connect the rake-handle with its operating-shaft, provided the said apparatus is of such a character that the revolutions of said shaft will impart to the rake the within-described continuous axial movements over and across a sector-shaped platform.

The gatherers F are secured to the arms of the reel-shaft by means of staples and set-screws in such a manner that the said gatherers may be adjusted to any desired position without varying the position of the reel-shaft.

Having thus fully described my improved raking apparatus for that description of harvesting-machines which are furnished with sector-shaped platforms, what I claim therein as my invention, and desire to secure by Letters Patent, is—

Connecting the handle of the rake to a transverse shaft in such a manner that the rotation of said shaft when aided by the curved guiding-rod R or its equivalent, will impart the within-described movements to said rake—viz., a sweeping axial movement from the inner edge of the sector-shaped platform (or a little beyond the same) over to the forward portion of said platform, and at that point instantly changing to an axial horizontal movement across the platform to the starting-point, and so onward in regular succession, substantially as herein set forth.

The above specification of my improvement in harvesting-machines signed and witnessed this 31st day of May, 1859.

McCLINTOCK YOUNG, JR.

Witnesses:
WM. T. BANTZ,
J. M. HARDING.